(12) United States Patent
Farhan

(10) Patent No.: US 6,433,906 B1
(45) Date of Patent: Aug. 13, 2002

(54) DIGITAL OPTICAL RECEIVER FOR CABLE TELEVISION SYSTEMS

(75) Inventor: Forrest M. Farhan, Alpharetta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/401,477

(22) Filed: Sep. 22, 1999

(51) Int. Cl.⁷ .................. H04B 10/00; H04B 10/12; H04B 10/20; H04J 14/02; H04J 14/08
(52) U.S. Cl. .................. 359/167; 359/118; 359/125; 359/137; 359/154; 359/173
(58) Field of Search .................. 359/167, 115, 359/118, 123, 124, 137, 189, 162; 725/121, 124, 129; 375/229, 350, 232

(56) References Cited

U.S. PATENT DOCUMENTS

| 4,633,484 A | * 12/1986 | Takeda et al. ........... 375/77 |
| 4,763,317 A | 8/1988 | Lehman et al. ........... 370/58 |
| 5,426,527 A | * 6/1995 | Steen et al. ........... 359/123 |
| 5,544,161 A | 8/1996 | Bigham et al. ........... 370/58.1 |
| 5,644,622 A | 7/1997 | Russell et al. ........... 455/422 |
| 5,748,348 A | 5/1998 | Heidemann et al. ........... 359/125 |
| 5,790,523 A | 8/1998 | Ritchie, Jr. et al. ........... 370/241 |
| 5,790,533 A | 8/1998 | Burke et al. ........... 370/318 |
| 5,878,325 A | 3/1999 | Dail ........... 455/5.1 |
| 5,892,865 A | 4/1999 | Williams ........... 385/24 |
| 5,915,205 A | 6/1999 | Chen ........... 455/5.1 |
| 5,966,636 A | 10/1999 | Corrigan et al. ........... 455/4.2 |
| 6,041,056 A | 3/2000 | Bigham et al. ........... 370/395 |
| 6,133,956 A | * 10/2000 | Ludgate et al. ........... 348/458 |
| 6,161,011 A | 12/2000 | Loveless ........... 455/426 |
| 6,323,793 B1 | 11/2001 | Howald et al. ........... 341/137 |

FOREIGN PATENT DOCUMENTS

| EP | 0 318 331 | 5/1989 | |
| EP | WO-97/30553 | * 8/1997 | .......... H04N/7/173 |
| EP | 0 828 391 | 3/1998 | .......... H04N/7/22 |
| JP | 09284233 | 10/1997 | .......... H04B/7/26 |
| WO | WO 97/30553 | 8/1997 | .......... H04N/7/173 |
| WO | WO 99/31885 | 6/1999 | .......... H04N/7/173 |

* cited by examiner

Primary Examiner—Jason Chan
Assistant Examiner—M. R. Sedighian
(74) Attorney, Agent, or Firm—Hubert J. Barnhardt, III; Kenneth M. Massaroni; Shelley L. Couturier

(57) ABSTRACT

A cable television system (400) includes a transmitter (200) for generating a digital optical signal and a receiver (201) for receiving such digital optical signal and converting it to an analog signal. The receiver (201) includes a digital filter (300) disposed between a deserializer (225) and a digital-to-analog converter (230), which digital filter conditions the digital electrical signal received from the deserializer (225). 1o The digital filter (300) is employed as a digital noise mitigation block so as to improve the quality of the signals in the reverse path, returning to the cable television system (400) headend (105).

8 Claims, 2 Drawing Sheets

DIGITAL OPTICAL RECEIVER FOR CABLE TELEVISION SYSTEMS

FIELD OF THE INVENTION

This invention relates in general to fiber optic communications, and more particularly to optical receivers for use in fiber optic communication systems.

BACKGROUND OF THE INVENTION

Many communications systems, such as those used to carry cable television signals, typically include a headend section for receiving satellite signals and demodulating the signals to an intermediate frequency ("IF") or a baseband signal. The baseband or IF signal is then modulated with radio frequency ("RF") carriers, then combined and converted to an optical signal for transmission from the headend section over fiber optic cable. Optical transmitters are distributed throughout the cable system for splitting and transmitting optical signals, and optical receivers are provided for receiving the optical signals and converting them to RF signals that are further transmitted along branches of the system over coaxial cable rather than fiber optic cable. Various additional devices are disposed in the television system to provide various functions. For example, devices known as taps are situated along the coaxial cable to split off the cable signal directed to the cable system subscribers. Amplifiers and hubs are disposed in the fiber optic system to receive, modify and boost the optical signal for further transmission over the fiber optic cable.

While cable systems have traditionally been designed in order to be one-way systems, that is for information to flow from the cable headend to the subscriber's location, changes in the cable industry have necessitated the ability for information generated at subscriber locations to flow back to the headend. Accordingly, cable systems have recently modified the installed cable plant so as to have not simply a forward path, i.e., information flowing from the headend to the subscriber, but now to include a reverse path to allow information from the subscriber to flow back to the headend. Examples of information that would flow in the reverse path would include data relating to status monitoring of the subscriber device, subscriber payper-view program selections, cable modem information, and two-way video and telephony services. The need for information flowing from the subscriber back to the headend is anticipated to increase as cable television systems continue to add two-way interactive services, such as e-mail and web browsing.

In order to facilitate the easy flow of information in the forward and reverse paths, the cable system has divided the available spectrum into forward path and reverse path portions. Accordingly, information transmitted from the headend to the subscriber is typically in the frequency range of between approximately 50 megahertz ("MHz") and 750 MHz. Conversely, information transmitted in the reverse path is typically in the frequency range from between about 5 MHz and 40 MHz. Various factors influence the ability to accurately transmit and receive optical signals within a cable television system. As the length of fiber optic cable within a system increases, for example, signal losses also increase. Further, temperature fluctuations which cause variation in the optical modulation index of the optical transmitter can result in variation of the RF output level of the optical receiver. Signal distortions may also be caused by non-linearities in the optical transmitter laser and photo diode of the optical receiver. Finally, many of the devices interposed in the forward and reverse paths themselves introduce noise and other distortions into the system. Accordingly, in many instances the range of the particular system in question is limited both in terms of distance and bandwidth capability.

Although these problems may be mitigated by employing expensive techniques, e.g., decreasing fiber length between optical nodes, such techniques may prohibitively increase costs to both subscribers and service providers. Accordingly, there exists a need for more reliable and accurate transmission of optical signals within a cable communications system. In particular, improved optical signal reliability and accuracy in reverse path transmissions is critically needed.

DETAILED DESCRIPTION OF THE PREFERRED EMBODIMENT

Figure 1:
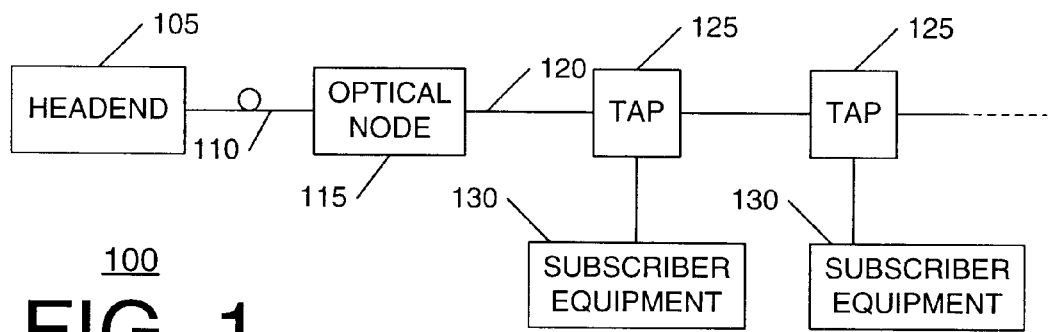
FIG. 1 is a block diagram of a cable television system in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1 there is illustrated therein a communication system, such as a cable television system 100 having both forward and reverse paths, i.e., having the ability to communicate downstream in the forward direction and upstream in the reverse direction. The cable television system 100 includes a headend 105 for receiving satellite signals that are demodulated to baseband or an intermediate frequency ("IF"). The baseband signal is then converted to cable television signals that are routed throughout the system 100 to subscriber equipment 130, such as settop decoders, televisions, or computers, located in the residences or offices of system subscribers. The headend 105 may, for example, convert the baseband signal to an optical signal that is transmitted over fiber optic cable 110, in which case a remotely located optical node 115 converts the optical signal to an electrical radio frequency ("RF") signal for further transmission through the system 100 over coaxial cable 120. Taps 125 located along the cable 120 and various points in the distribution system split off portions of the RF signal for routing to subscriber equipment 130 coupled to subscriber drops provided at the taps 125.

As noted above, the system 100 may also have reverse transmission capability so that signals, such as data, video or voice signals, generated by the subscriber equipment 130 can be provided back to the headend 105 for processing. The reverse signals travel through the taps 125 and any nodes 115 and other system equipment, e.g., reverse amplifiers, to the headend 105. In the configuration shown in FIG. 1, RF signals generated by the subscriber equipment 130 travel to the node 115 which converts the RF signals to optical signals for transmission over the fiber optic cable 110 to the headend 105.

Figure 2:
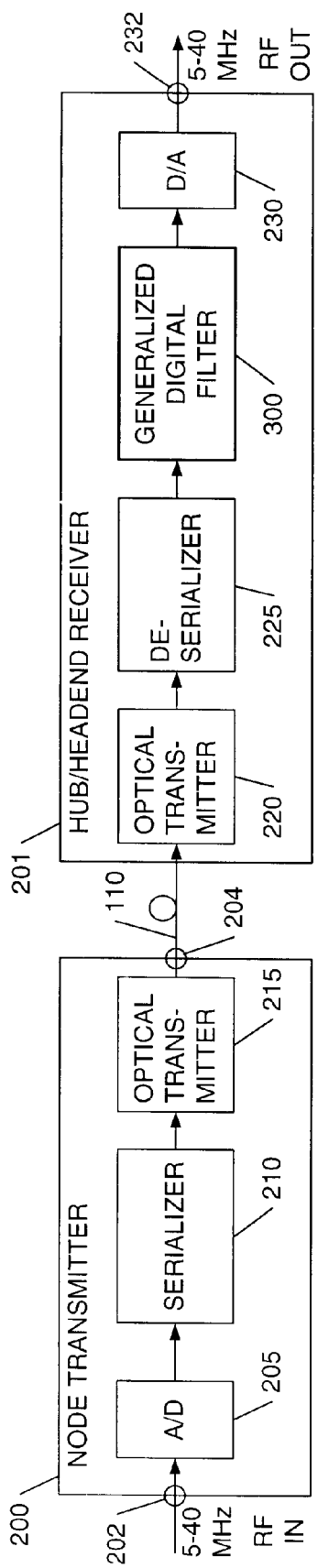
FIG. 2 is a block diagram of an optical transmitter coupled to an optical receiver included in the cable television system of FIG. 1, in accordance with the instant invention.

Referring now to FIG. 2 there is illustrated therein a digital optical transmitter 200 and a digital optic receiver 201 adapted for use in the system 100 of FIG. 1. In particular, the transmitter 200 and receiver 201 are adapted to transmit digital optical signals to the headend 105 in the reverse direction. The digital optical transmitter 200 may, for example, be included within the optical node 115, although other locations within the cable television system 100 may also include the digital 15 optical transmitter 200. The transmitter 200 receives at an input 202 an analog information signal that is representative of one or more reverse RF signals from the subscriber equipment 130. As is noted above, information transmitted in the reverse path is typically in the range of between 5 and 40 MHz RF. At its output 204 the transmitter 200 provides a digital optical signal that is generated in accordance with the analog information signal. The digital optical signal is transmitted over the fiber optic cable 110 to the receiver 201 and the headend 105. The transmitter may also provide an optical pilot tone that serves to provide a reference level during processing at the headend 105 as is described in commonly assigned, co-pending patent application Ser. No. 09/169,612 filed Oct. 9, 1998 and entitled "Digital Optical Transmitter" to Farhan, the disclosure of which is incorporated herein by reference.

More particularly, the digital optical transmitter 200 includes an analog-to-digital converter ("ADC") 205 for converting the analog input to a digital signal, i.e., a digital word comprising of a particular number of bits, in a conventional manner. The resolution of the ADC 205 of course is dependent upon transmitter design parameters. The transmitter 200 may also include a parallel-to-serial ("P/S") converter or serializer 210 which receives inputs from the ADC 205 and other components, and converts inputs to a serial bit stream. An optical transmitter 215, such as for example a laser diode, is then driven to generate an optical signal in accordance with the serial bit stream. It will be appreciated that a serializer such as serializer 210 may also include a driver for driving the laser diode of the optical transmitter 215 and frame and coding circuitry for encoding the serialized digital signal into frames of data. The output signal at output 204 is then transmitted along the optical fiber 110 to digital optical receiver 201.

The receiver 201 may be, for instance, located in the headend 105, or other locations such as any intervening nodes or hubs may likewise employ the receiver 201. The receiver 201 includes a detector 220 such as a photo diode for receiving the digital optical signal transmitted over fiber optic cable 110 and generating therefrom a serial stream of electrical pulses in accordance with the optical signal. The output signals provided by the detector 220 are coupled to a serial-to-parallel ("S/P") converter or deserializer 225 for generating therefrom a set of parallel outputs corresponding to a digital word. The receiver 201 further includes a digital-to-analog converter ("DAC") 230 for converting the signal provided at its digital input to an analog signal in a manner well known in the art. The signal output at output 232 of receiver 201 is an RF signal in the range of 5 to 40 MHz. The receiver 201 further includes a generalized digital filter 300 coupled between deserializer 225 and DAC 230.

Figure 3:
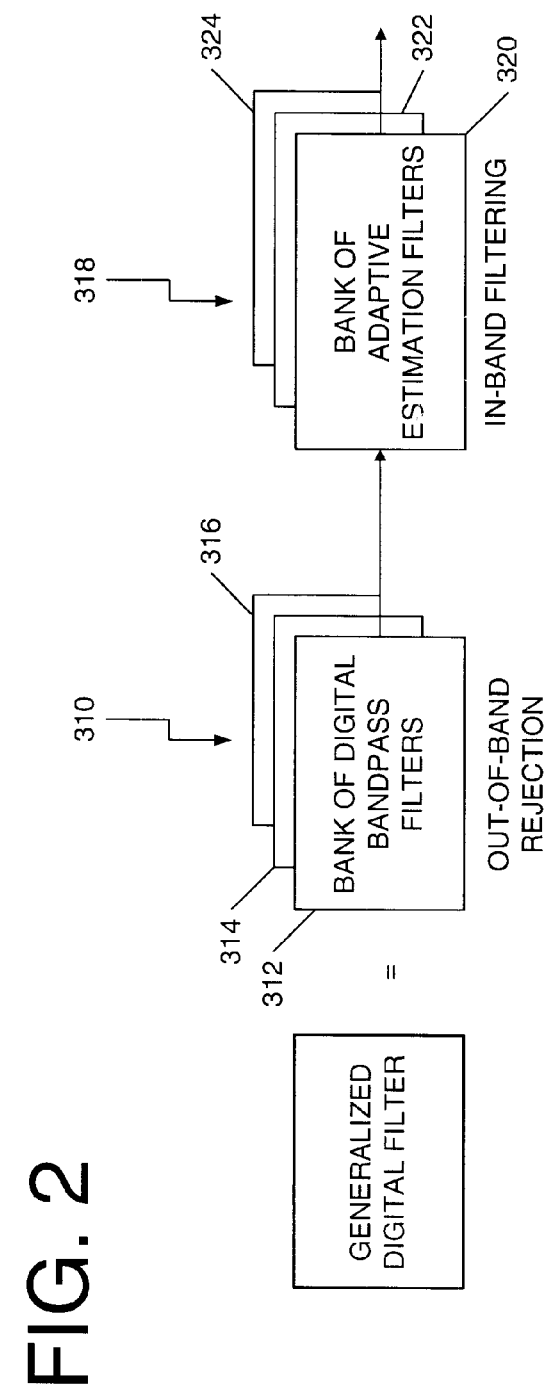
FIG. 3 is a block diagram of a digital filter, in accordance with the instant invention.

Referring now to FIG. 3 there is illustrated therein the generalized digital filter 300 employed in receiver 201 in FIG. 2. The generalized digital filter may include one or more filter devices adapted to filter the signal output by deserializer 225 according to one or more filtering criteria. Accordingly, the generalized digital filter 300 may include a first filter device including one or a plurality of filters for filtering according to a first criteria. In this embodiment, a first filter 310 may include one or a plurality of digital bandpass filters, each bandpass filter adapted to filter different spatial portions of the digital electrical signal output from deserializer 225. In such an embodiment, a series of digital bandpass filters, for example bandpass filters 312, 314, and 316 filter different portions of the RF input signal. Accordingly, for a desired pass band of 7–15, 20–27 and 30–40 MHz (or rejection of bands 5–6, 16–20 and 28–30 MHz) bandpass filter 318 may filter signals above and below the range of, for instance, 7–15 MHz; digital bandpass filter 314 would filter out signals below 20 and above 27 MHz; and digital bandpass filter 316 would filter out signals below 30 and above 40 MHz. The filter signals are then fed to the DAC in appropriately filtered condition and returned to the headend.

Additionally, or alternatively, the generalized digital filter 300 may include one or a plurality of adaptive estimation filters adapted to receive the digital electrical signal generated by deserializer 225 and passing it along to the DAC 230. In such an embodiment, the adaptive estimation filter may include but a single or, as with respect to filter 310, a plurality of estimation filters such as filters 320,322 and 324. The bank of adaptive estimation filters 318 may be, for example Kalman filters, or linear predictive filters, in which the incoming signal is digitally tuned to the desired passband. A more practical approach would be to require filters 310 to perform decimation and spectral relocation to between 0 and "B" MHz where "B" is an optimized bandwidth where all filters 318 can function. "B" could be for example 6 MHz. The advantage of using adaptive estimation filters 318 is to estimate or pass the desired signal within a known passband, whereas the bandpass filters 310 simply pass the passband and reject the out of band signal. Thus the filters 310 are deterministic filters that do not depend upon passband statistics. Filters 318 however are statistical filters that adaptively learn or train themselves based on passband statistics.

In yet another embodiment of the digital filter 300 of the receiver 201, the digital bandpass filters 310 may be combined with the adaptive estimation filters 318. Accordingly, the digital electrical signal output from deserializer 225 is filtered according to at least two criteria, first criteria provided by the filter 310, and the second criteria provided by filter 318. In this embodiment, the first filter filters according to, for example, different spectral portions of the digital electrical signal. Thereafter, a plurality of adaptive estimation filters, such as those described herein above, are coupled to the plurality of digital bandpass filters, so that there is a corresponding one adaptive estimation filter for each one digital bandpass filter. Accordingly, particular spectral portions of the RF signal are filtered out by the digital bandpass filters, and then are passed to the adaptive estimation filters for further filtering and conditioning. Such an implementation has been found to be very effective in rejecting out-of-band interferences, and inband interference rejection has been shown to be particularly effectively treated by the combination of the bandpass filter and estimation filters.

Figure 4:
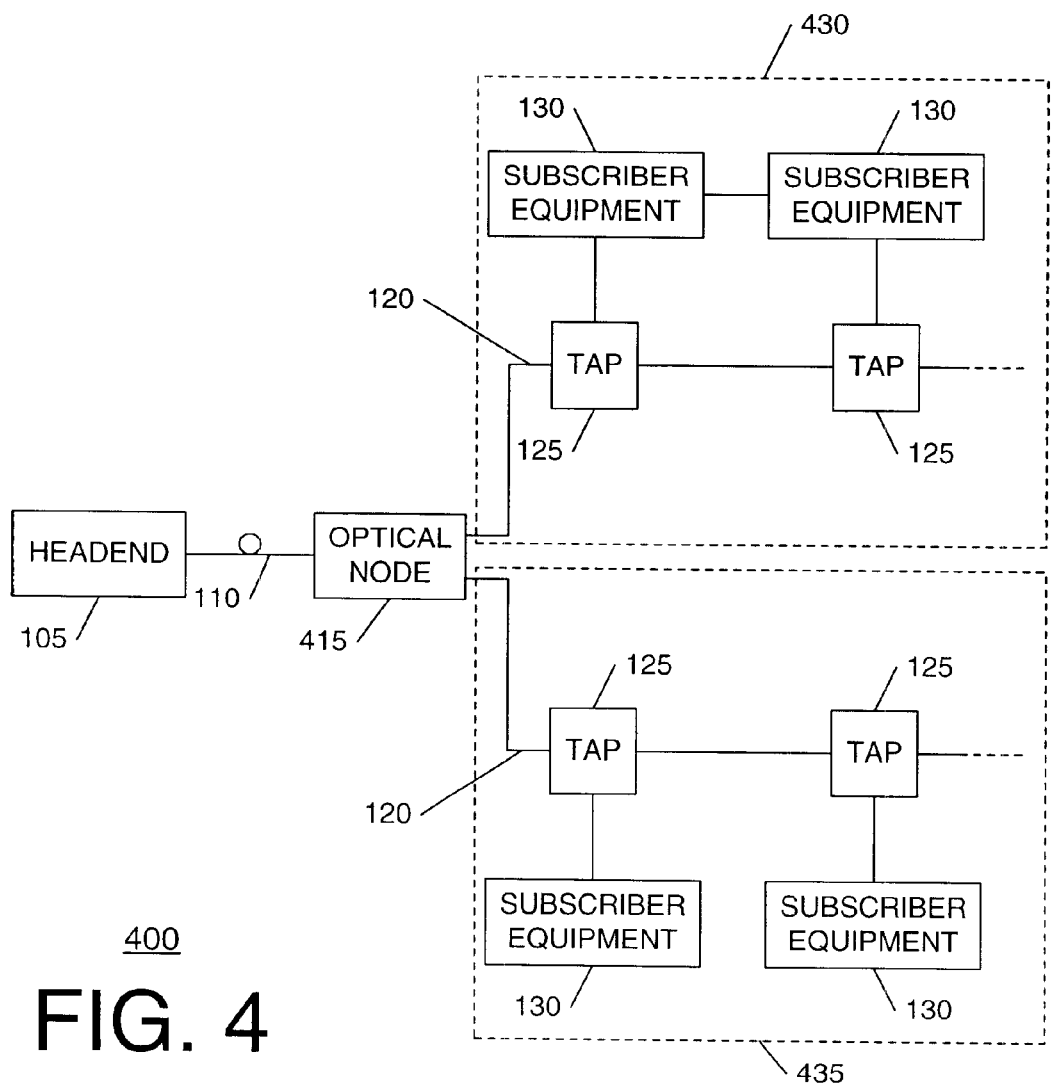
FIG. 4 is a block diagram of a cable television system having multiple outputs to subscriber regions in accordance with the instant invention.

Referring now to FIG. 4, a modified cable system 400 is depicted. The system 400 includes a headend 105 for generating cable television signals that are split off to subscriber equipment 130 by taps 125. However, in the system 400 the optical node 415 splits off the downstream cable signal for transmission to multiple distribution systems 430 and 435 or branches. Each branch typically provides service to subscribers located in different geographic regions. Upstream reverse signals provided by subscriber equipment 130 in the different branches 435 is transmitted in the form of analog RF signals to the optical node 415, which combines the signals for further upstream transmission in the form of an optical signal. According to the present invention, the upstream signals from the different branches may be converted to digital optical signals in a manner that minimizes or eliminates many of the problems associated with prior art cable television systems.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a communications system including an optical transmitter for transmitting digital optical signals via a communications medium to an optical receiver, the optical receiver comprising:

a detector for receiving a digital optical signal and for converting said digital optical signal to a serial stream of electrical pulses;

a serial-to-parallel converter for converting said serial stream of electrical pulses to a set of parallel outputs corresponding to a digital word;

a first digital filter coupled to said serial-to-parallel converter and adapted to filter said digital word, wherein said first digital filter comprises at least one bandpass filter, and wherein the at least one bandpass filter is adapted to filter a different spectral portion of said digital word;

a second digital filter coupled to said first digital filter, said second digital filter adapted to filter said filtered digital word, wherein said second digital filter comprises at least one adaptive estimation filter, and wherein each adaptive estimation filter is coupled to each bandpass filter; and a digital to analog converter coupled to the second digital filter for converting the filtered digital word to an analog electrical signal.

2. An optical receiver as in claim 1, wherein said receiver is disposed in the headend of a cable television system.

3. An optical receiver as in claim 1, wherein said receiver is disposed in a hub deployed in a cable television system.

4. The communications system of claim 1, wherein said first digital filter comprises a plurality of bandpass filters.

5. The communications system of claim 4, wherein said second digital filter comprises a plurality of adaptive estimation filters.

6. A cable television system for providing signals, the cable television system comprising:

an optical transmitter for receiving an analog information signal and transmitting in accordance therewith a digital optical signal representative of the analog information signal;

an optical receiver for receiving the digital optical signal via a communication medium and receiving therefrom an analog signal representative of the analog information signal, said optical receiver including a converter for converting said digital optical signal to a digital electrical signal, and a digital filter for filtering said digital electrical signal according to at least one criteria, the digital filter comprising:

a first digital filter adapted to filter a different spectral portion of the digital electrical signal; and a second digital filter coupled to the first digital filter, wherein the second digital filter is an adaptive estimation filter, whereby combining the first and second digital filters reject out-of-band and in-band interference.

7. A cable television system as in claim 6, wherein said first digital filter compromises a plurality of bandpass filters.

8. A cable television system as in claim 7, wherein said second digital filter comprise s a pluraity of adaptive estimation filters.

\* \* \* \* \*

UNITED STATES PATENT AND TRADEMARK OFFICE
CERTIFICATE OF CORRECTION

PATENT NO. : 6,433,906 B1
DATED : August 13, 2002
INVENTOR(S) : Farhan

It is certified that error appears in the above-identified patent and that said Letters Patent is hereby corrected as shown below:

<u>Title page,</u>
Item [57], ABSTRACT,
Line 8, delete "lo"

<u>Column 1,</u>
Line 43, delete "payper-view" and insert therefore -- pay-per-view --

<u>Column 3,</u>
Line 7, delete "15"

<u>Column 4,</u>
Line 21, delete "320,322" and insert therefore -- 320, 322 --
Line 46, delete "herein above," and insert therefore -- hereinabove, --

<u>Column 6,</u>
Line 34, delete "compromises" and insert therefore -- comprises --
Line 36, delete "comprise s" and insert therefore -- comprises --
Line 36, delete "pluraity" and insert therefore -- plurality --

Signed and Sealed this

Twenty-sixth Day of November, 2002

*Attest:*

JAMES E. ROGAN
*Director of the United States Patent and Trademark Office*

*Attesting Officer*